United States Patent [19]

Gronek et al.

[11] 4,431,474
[45] Feb. 14, 1984

[54] THERMOCOMPRESSION BONDING APPARATUS

[75] Inventors: Fred J. Gronek, North Riverside; Raymond M. Taradejna, Bolingbrook; Ray A. Watkins, Aurora, all of Ill.

[73] Assignee: Western Electric Company, Inc., New York, N.Y.

[21] Appl. No.: 407,968

[22] Filed: Aug. 13, 1982

[51] Int. Cl.³ .................. B30B 5/02; B30B 15/34; B23K 27/00; B02C 11/08
[52] U.S. Cl. .................. 156/583.1; 156/580; 100/93 P; 100/295; 219/243
[58] Field of Search .................. 156/580, 583.1, 583.4, 156/583.6, 583.7; 100/92 P, 211, 295; 219/243

[56] References Cited

U.S. PATENT DOCUMENTS

| | | | |
|---|---|---|---|
| 1,437,209 | 11/1922 | Wenderhold | 339/30 |
| 3,172,798 | 3/1965 | Rosenbaum | 156/583.1 |
| 3,649,809 | 3/1972 | Halstead | 219/239 X |
| 3,743,558 | 7/1973 | Ludwig | 156/73.1 X |
| 3,916,148 | 10/1975 | LaFleur | 219/243 |
| 4,284,466 | 8/1981 | Chayka et al. | 156/583.7 |

FOREIGN PATENT DOCUMENTS

1541412 2/1979 United Kingdom ............ 156/583.1

Primary Examiner—Edward C. Kimlin
Assistant Examiner—Merrell C. Cashion
Attorney, Agent, or Firm—K. R. Bergum; R. P. Miller; H. St. Julian

[57] ABSTRACT

A thermocompression bonding apparatus (10), which is particularly adapted to bond an array of miniaturized electrical leads (36) to a corresponding array of respectively aligned pads (33) of a metallized circuit, supported on a substrate (31), includes a specially constructed and internally heated bonding thermode (12) that is uniquely pin-coupled at an upper surface midpoint portion thereof to the lower end of a single support rod (54). The latter is resiliently supported at its upper end, preferably through the use of a plurality of coaxially mounted Belleville washers (77), within an oversized central bore of a three-plate support assembly (14). The latter is, in turn, adapted to be secured to a reciprocally driven member, such as a multipost-mounted platen (16), of the composite apparatus. The support assembly (14) includes an upper internally cooled metal plate (47), an intermediate insulative plate (49) and a lower metal plate (52), the latter formed with two downwardly extending and longitudinally spaced pairs of alignment brackets (126,127). The support rod (54), as thus resiliently mounted and pin-coupled to the thermode (12) continuously urges the latter (whether hot or cold) against downwardly projecting alignment ribs (52a) of the lower support plate (52) in a manner that advantageously allows the thermode to thermally expand in all directions while being heated to the requisite bonding temperature. This has been found to greatly minimize an otherwise tendency of the thermode bonding rail (12a), in particular, to acquire a detrimental non-linear profile, or bow, therealong when heated.

18 Claims, 7 Drawing Figures

THERMOCOMPRESSION BONDING APPARATUS

TECHNICAL FIELD

This invention relates to thermocompression bonding apparatus and, more particularly, to the construction of the bonding member, and a support assembly therefor, as employed in such apparatus.

BACKGROUND OF THE INVENTION

Thermocompression bonding is a technique involving the simultaneous application of a predetermined amount of heat and pressure at the interface between two mating articles so as to effect a fusion type bond therebetween. Thermocompression bonding is frequently employed in demanding electronic assembly applications, such as in bonding an array of miniaturized gold plated leads, generally formed out of a lead frame, to a corresponding array of respectively aligned gold plated pads, which comprise accessible extensions of a metallized circuit. Such circuits are often fabricated on a relatively fragile substrate, typically of ceramic material.

In such thermocompression bonding applications, it becomes readily apparent that both the temperature and pressure employed constitute critical operating parameters, because either an insufficient or an excessive amount of either of these parameters can lead to defective thermocompression bonds. In addition, an excessive amount of heat and/or pressure can damage the circuit or substrate. Other important variables that affect the quality of a plurality of simultaneously produced bonds relate, for example, to the dimensional stability, uniformity of heat and hardness exhibited by the bonding member at the requisite elevated temperature. The thickness, hardness and cleanliness of the materials to be joined also affect the degree of material deformation and/or metal-to-metal fusion that occurs at the bonding site(s).

In attempting to distribute the necessary heat and pressure uniformly to all of the leads of an array thereof to be thermocompression bonded to an aligned array of circuit pads, an internally heated, and retractably mounted elongated bonding member has normally been employed to effect such bonded connections simultaneously. Such a bonding member, which normally includes at least one downwardly projecting bonding rail, is generally referred to as a "thermode", and will be so defined hereinafter.

A major problem encountered heretofore in using such a thermode is the fact that when it is heated to the necessary operating temperature (typically in a range of 750° C. to 950° C.) to effect reliable lead-pad thermocompression bonds, the bonding rail has had a tendency to become slightly bowed in either a concave or convex direction. Such bowing has been caused primarily by one or both of the following: (1) the establishment of a non-uniform temperature gradient along the longitudinal length of the thermode, and/or (2) the mounting of the thermode in a manner that restricts the thermal expansion thereof in all directions while being heated to the requisite elevated temperature.

With respect to the first-mentioned factor, a non-uniform temperature gradient has been found to result in many cases from the use of a thermode having a pronounced non-symmetrical cross-section relative to the elongated heater cartridge (or cartridges) mounted therein. This results in the thermode having wall areas that may vary appreciably in thickness and, hence, in temperature when heated.

As for the second above-listed factor, it has been common practice heretofore to fixedly mount the thermode, such as by threaded fastening members, to an associated support plate or hanger assembly, often referred to as part of a bonding head. As a typical thermode can grow, due to thermal expansion, at least 0.015 inch in even its smallest dimension when heated to a requisite bonding temperature, it is seen that tremendous forces are exerted on the fastening members. The resulting restricted freedom of the thermode to grow in all directions directly produces dimensional instability (non-uniformity), which contributes in a material way to a non-linear, and in most cases, a bowed bonding rail. Another problem that arises when using thermode fastening members of the threaded type, in particular, is that regardless of the material out of which they are made, they tend to become "welded" in the tapped holes of the thermode and/or support structure over a short period of time. This is caused primarily by both the temperature-induced surface oxidation and the thermal expansion-induced stress imparted thereagainst), making it very difficult to thereafter remove the thermode for repair or replacement.

Thus, while the bonding rail of a thermode of the type in question can be initially (or periodically) precisely machined so as to have what would normally be thought of as an ideal flat or linear surface. This has often proven insufficient in regard to ensuring that all of a plurality of simultaneously effected thermocompression bonds are of satisfactory quality. An initially machined-flat thermode bonding rail likewise has provided no assurance against the possibility of the circuit substrate cracking due to excessive pressure exerted against one or more discrete regions therealong, as a result of the the bonding rail, in many cases, having actually acquired only a slightly bowed profile after being heated to the requisite bonding temperature.

The severity of the thermode bowing problem can be more fully appreciated when it is realized that in one typical and demanding electrical lead-metallized circuit pad thermocompression bonding operation, any non-linear deviation along the thermode bonding rail (or rails) as small as 0.0005" can adversely affect the quality of some of the bonded connections. Such deleterious connections most often occur along either the center or end regions of the bonding rail, which region(s) depending upon the direction of any bow that is produced in a given thermode if neither compensated for nor obviated in some manner.

There have been several techniques employed heretofore, with limited success, to compensate for any temperature-induced bow in the bonding rail of a thermode and, particularly, when the latter has been fixedly secured to an associated support structure. One such technique has involved trying to grind a bow in the bonding rail, when cold, that is the mirror image of the bow normally found therein when hot, so as to ideally result in a heated bonding rail that is perfectly flat. This has proved very difficult, if not impossible, to accomplish in practice, primarily because a temperature-induced bow in a fixedly secured thermode, and/or in one having a variable temperature gradient along its length normally does not exhibit an arcuate profile that ideally approximates a smoothly generated, mathematically-defined curvature.

An alternative prior technique has been to grind the bonding rail flat after the thermode has been heated to the desired operating temperature. This is not only a hazardous operation, but poses a number of problems. More specifically, it is necessary to use a sound detecting technique to determine when the grinding wheel actually contacts the hot bonding rail. It has also been found that the grinding wheel normally creates a significant burr on the heated rail, which must be removed after the thermode is cooled to room temperature. In addition to these problems, the resulting bonding rail surface is also disadvantageously considerably more porous (rougher) after having been ground flat while heated than after having been ground with a counter bow while unheated.

Another technique employed heretofore to minimize temperature-induced bow along the bonding rail of a thermode has been to loosely suspend the latter from two pairs of longitudinally spaced, and downwardly extending brackets which, in turn, are rigidly secured at their upper ends to an associated support member or hanger of the bonder. Considered more specifically, the thermode is mounted on such brackets through the use of pins, each of which projects outwardly from a given thermode sidewall and into an aligned oversized keyway of the adjacent bracket. The function of the bracket keyways, of course, is to allow for the thermal expansion of the thermode in all directions when heated. Concomittently, the spacing between each pair of brackets is chosen so as to accommodate the width dimension of the thermode in relatively close fitting relationship therewith, thus ensuring accurate horizontal angular alignment of the thermode rail with a plurality of underlying circuit leads and pads, for example, to be thermocompression bonded together.

While such a mounting arrangement does allow for the relatively unrestricted thermal expansion of the thermode when heated, such expansion in the width dimension often results in the sidewalls of the thermode firmly contacting the brackets in a spring-biased manner. This frictional engagement has often been sufficient to cause the thermode to "hang up" on the brackets and, thereby, acquire a skewed orientation. When this "hang-up" condition occurs, precise parallelism of the thermode bonding rail relative to an underlying circuit substrate cannot be achieved in a consistent and reliable manner.

Still another approach employed heretofore to maintain a thermode bonding rail linear and, thereby, establish continuous parallelism between the rail and an underlying circuit substrate, is disclosed in U.S. Pat. No. 4,284,466 of G. A. Chayka et al., assigned to the same assignee as the present invention. As disclosed in that patent, the bonding rail forms part of a replaceable thermode insert, or bonding tip. By mounting the major portion of the bonding tip within a dovetailed groove formed in the main body portion of the thermode, a wedging action imparted against the bonding tip when heated minimizes the thermal resistance across the interfaces therebetween. Such wedging action is further relied upon to maintain the bonding tip in continuous parallelism with an inner mating reference surface of the main body portion of the thermode, which surface is initially adjusted so as to be in parallelism with an underlying article involved in a given bonding operation, such as a circuit substrate. Such established bonding tip parallelism, of course, is directly dependent on the major body portion of the thermode, of much larger mass, remaining precisely uniform dimensionally as it grows, as a result of thermal expansion when heated. As previously noted, such dimensional uniformity is very difficult to achieve whenever a thermode, whether of one piece or of multiple piece construction, is rigidly mounted to an associated support structure.

There thus has been an urgent need for a simplified, reliable and inexpensive technique for mounting a thermode in a composite thermocompression bonder such that the bonding rail, even after repeated use over extended periods of time, will remain linear, within exceedingly close tolerances, along its length while at the requisite bonding temperature. Only in this way can there be assurance that all of a plurality of simultaneously established thermocompression bonds produced with a given thermode will be of uniform and consistent quality and, in the case of substrate-supported lead-pad bonded connections, assurance that no damage will occur to either the leads, mating pads or substrate.

SUMMARY OF THE INVENTION

In accordance with the principles of the present invention, one preferred illustrative thermocompression bonding assembly, particularly adapted to bond an array of miniaturized electrical leads to a corresponding array of respectively aligned pads of a metallized circuit, includes an internally heated bonding thermode that is uniquely secured to only a single, resiliently mounted support rod which forms part of a specially constructed hanger or support assembly.

The support assembly includes a unique platen-mounted, reciprocally displaceable die set, comprised of an upper internally cooled metal plate, an intermediate insulative plate, and a lower metal plate formed with two downwardly extending and longitudinally spaced pairs of thermode alignment and back-up support brackets. The lower plate also includes a plurality of downwardly protruding ribs that define horizontally disposed reference alignment points for establishing precise parallelism between the thermode and the support assembly.

To that end, the resiliently mounted support rod is adapted to continuously bias upper surface contact areas of the thermode, whether heated or not, against the mating alignment ribs of the lower support plate of the composite support assembly. As thus mounted, the thermode is advantageously free to grow, due to thermal expansion, in all directions, thus greatly minimizing an otherwise tendency of the bonding rail, in particular, to acquire a detrimental non-linear profile, or bow, therealong when heated. In addition, with the thermode being continuously spring-biased against the associated support assembly, parallelism is always assured between the bonding rail and the precisely mounted, and reference plane-defining support structure. This, of course, likewise insures that parallelism is continuously maintained between the bonding rail and the upper surface(s) of an underlying article, such as a substrate-supported metallized circuit, on which a bonding operation is to be performed.

The necessary resilient mounting of the support rod is preferably accomplished through the use of a plurality of Belleville-type washers (in contrast to a coil spring) that are coaxially mounted on an upper end portion of the support rod, and compressively confined between an upper adjustable end stop thereon and a lower spacer block of the composite support assembly. The Belleville washers are effectively isolated from the heat of the thermode by being confined within a central bore of the upper internally cooled support plate. This substantially minimizes the possibility of the washers failing because of metal fatigue and, thus, their useful life is appreciably extended.

The intermediate insulative pipe also serves a very significant function, namely, to reduce heat loss to the upper internally cooled plate, as well as to the drive source for reciprocating the composite three-plate die set, together with a thermode resiliently secured thereto. This advantageously allows the temperature "set point" for the heater cartridge to be appreciably lower than would otherwise be possible in order to achieve a necessary operating bonding rail temperature. This not only extends the life of the thermode heater cartridge(s), but the lower heater temperature set point also directly reduces the degree of inherently potentially troublesome thermal expansion that occurs in a given thermode when heated to the requisite bonding temperature.

With the thermode also being formed with a cross-section such that the one or more longitudinally disposed heater cartridges mounted therein are positioned so as to effect substantially uniform heating throughout both the thickness and length dimensions of the sidewalls thereof, any tendency of the thermode to acquire a detrimental bow when heated to the requisite bonding temperature is further minimized.

DETAILED DESCRIPTION OF THE INVENTION

It should be understood that while the invention is described in detail herein relative to effecting the thermocompression bonding of an array of electrical leads to a corresponding array of respectively aligned pads of a substrate-supported metallized circuit, the subject bonding apparatus is applicable for use in joining many other diverse types of articles together under controlled amounts of heat and pressure when simultaneously applied thereto through the use of an internally heated thermode.

Figure 1:
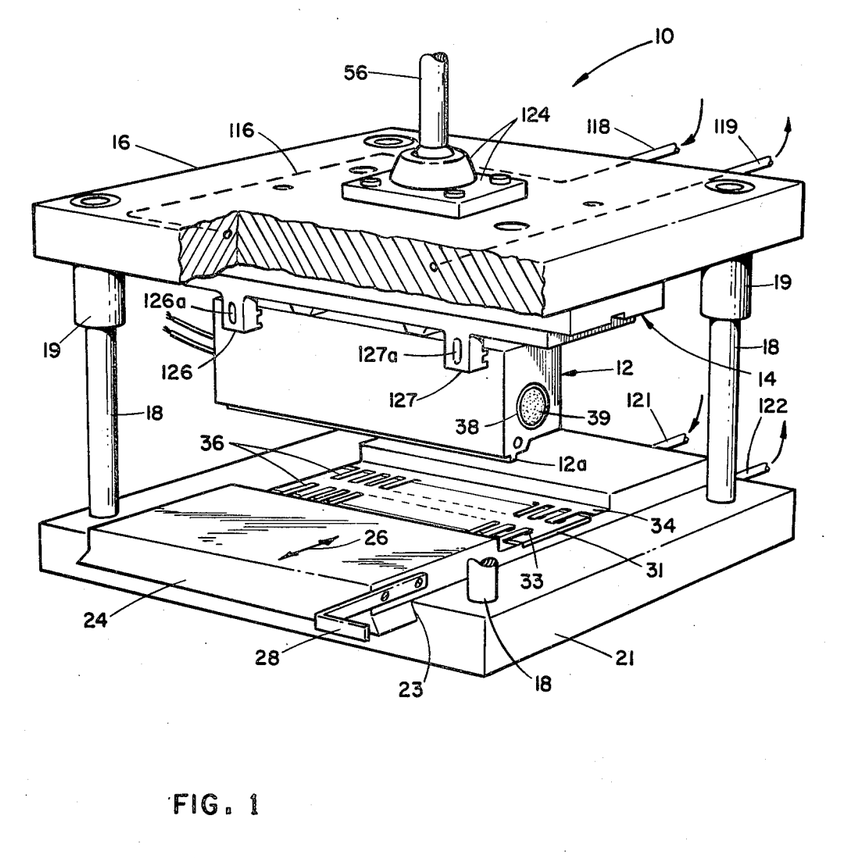
FIG. 1 is a perspective view, partially in section, of a thermocompression bonding apparatus and, in particular, illustrates the manner in which the bonding member, in the form of a thermode, is resiliently mounted on a retractable support assembly, in accordance with the principles of the present invention, so as to be free to expand in all directions when heated to an elevated temperature, thus minimizing the possibility of any bow developing along the bonding rail thereof.

With particular reference first to FIG. 1, there is illustrated a thermocompression bonding apparatus 10 which includes an elongated thermode 12 that is typically formed with at least one precisely machined bonding rail 12a that projects downwardly from the underside surface thereof. In accordance with an aspect of the invention, the thermode is resiliently secured to a specially constructed, and reciprocally mounted, thermode support assembly 14. The latter assembly is secured to an upper platen 16 that is supported for reciprocal displacement on four vertically oriented support posts 18 through separate bushings 19. The lower ends of the support posts are secured within respectively aligned bores of a support bed 21.

In the illustrative embodiment, the bed 21 is formed with a dovetailed channel 23 which is adapted to receive and confine a bonding platform 24 for movement therealong in the directions of the arrows identified by the reference numeral 26. An L-shaped handle 28, secured to a forward edge of the bonding platform 24, facilitates the reciprocal horizontal displacement thereof so as to bring two articles supported thereon, and to be bonded together, into proper alignment with the bonding rail 12a of the vertically displaceable thermode 12.

By way of example only, the articles supported on the bonding platform comprise a substrate 31, on which is formed a metallized circuit (not shown) that includes two arrays of bonding pads 33 (only four representative pads seen), and an overlying lead frame 34 having two arrays of leads 36, with each array of leads being respectively aligned and in contact with the corresponding array of bonding pads.

It should be appreciated that suitable index stops (not shown) may be readily employed to ensure the desired alignment between the thermode bonding rail (or rails) 12a and each of the aligned arrays of circuit leads and pads to be thermocompression bonded together therebeneath. It is also apparent that the reciprocally mounted bonding platform 24 could be guide rod-mounted, if desired, and/or include substrate (or other type article) alignment pins, or adjustable and/or interchangeable nest-type fixturing (neither shown), for a particular bonding application.

With particular reference again to the thermode 12, it typically includes at least one longitudinally disposed bore 38 which is dimensioned to support a conventional elongated heater cartridge 39 of conventional construction. The thermode 12 may be made out of a number of different materials, one preferred material for use at temperatures preferably below 750° C. being an alloy sold under the tradename Inconel 718, by Huntington Alloys Inc. Another proprietary alloy that exhibits similar advantageous characteristics, even at elevated temperatures in the range of 850° C. to 950° C., is sold under the tradename Udimet 720, by the Special Metals Corporation. Both of these materials exhibit oxidation resistance, thermal characteristics, and substantially higher hardness at the necessary elevated temperatures for bonding than most other metals. As a result, the bonding rail surface of such a thermode does not have to be frequently machined to an original linear, polished surface.

Notwithstanding what material is employed to fabricate a thermode 12 of the type illustrated, whenever it is heated over 750° C. for a particular bonding application, detrimental bowing of the bonding rail 12a thereof may readily occur if special precautionary measures are not taken with respect to the construction and mounting thereof.

Figure 7:
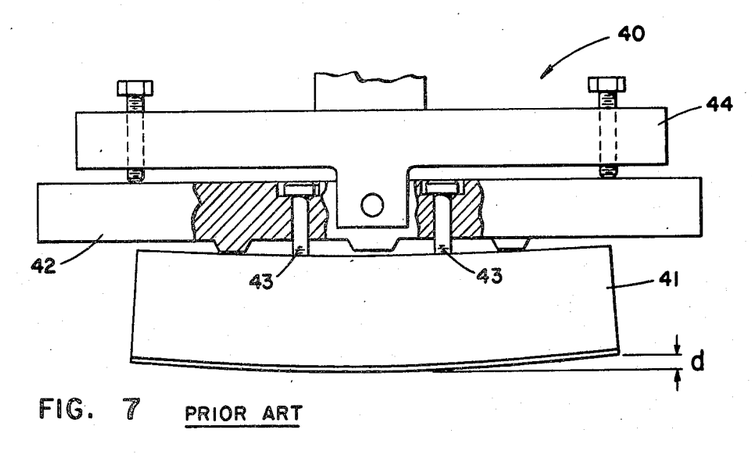
FIG. 7 is an enlarged side elevational view of an illustrative Prior Art thermode, as typically rigidly secured to an overlying support member, with one type of bowed condition that can readily result from the disadvantageously restricted freedom of the thermode to thermally expand being shown in exaggerated form for purposes of clarity.

One particular bowed condition that has been encountered heretofore is illustrated in a thermode support assembly 40, designated "prior art" in FIG. 7. As shown, a thermode 41 is rigidly secured to a support plate 42, by threaded fasteners 43, with the support plate, in turn, being fixedly secured to a hanger assembly 44. As thus supported, the inherent growth of the thermode 41, as a result of thermal expansion when heated, is restricted, causing the thermode bonding rail to develop an often detrimental bowed (or other non-linear) profile. The illustrative concave bow shown is exaggerated dimensionally, as identified by the letter "d", for the purposes of clarity and better understanding the problem of particular concern herein.

As previously noted, attaining dimensional stability in a bonding thermode requires: (1) forming the thermode with an essentially symmetrical cross-section relative to the centrally mounted and elongated heater cartridge(s), (2) minimizing heat loss to the drive source coupled to the thermode support structure and, most importantly, (3) providing a mounting structure that allows the thermode to expand (or contract) relatively freely in all directions as the temperature thereof is increased (or decreased).

Figure 4:
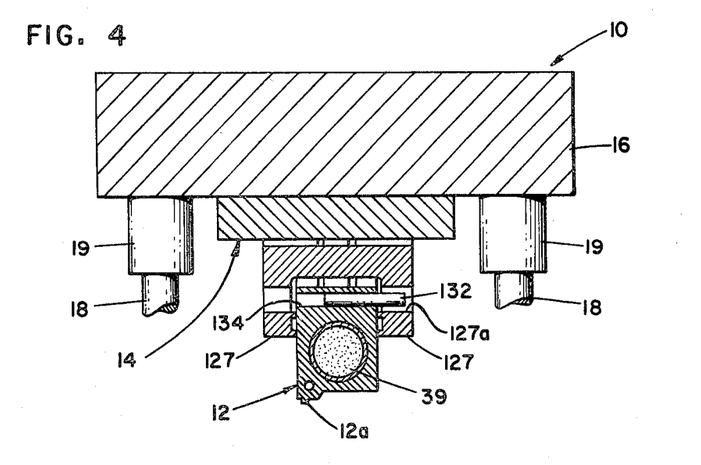
FIG. 4 is a fragmentary side elevational view, partially in section, taken along the line 4—4 of FIG. 3, showing in greater detail certain structural features of one of the downwardly extending, pin-receiving brackets of one pair thereof, each pair being adapted to closely straddle the thermode, but without interfering with either the thermal expansion or precise horizontal alignment of the thermode.

With respect to thermode symmetry, it is seen in FIGS. 1 and 4 that the thermode 12 is formed with a relatively square cross-section, and that the elongated heater cartridge 24 is essentially axially disposed therein. This ensures that the thermode is uniformly heated along the length thereof, at least in the region that is co-extensive with the heater cartridge.

Figure 2:
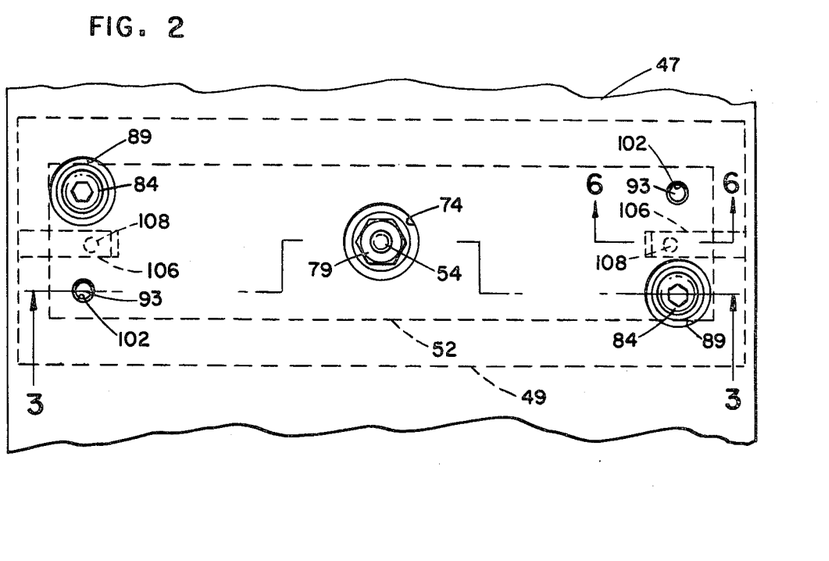
FIG. 2 is a fragmentary plan view of the upper plate of the composite support assembly of FIG. 1, showing in greater detail the locations of the fastening members, alignment pins and the central thermode support rod, with the intermediate insulative member, and associated nesting stops, of the support assembly being shown in phantom line form.
Figure 3:
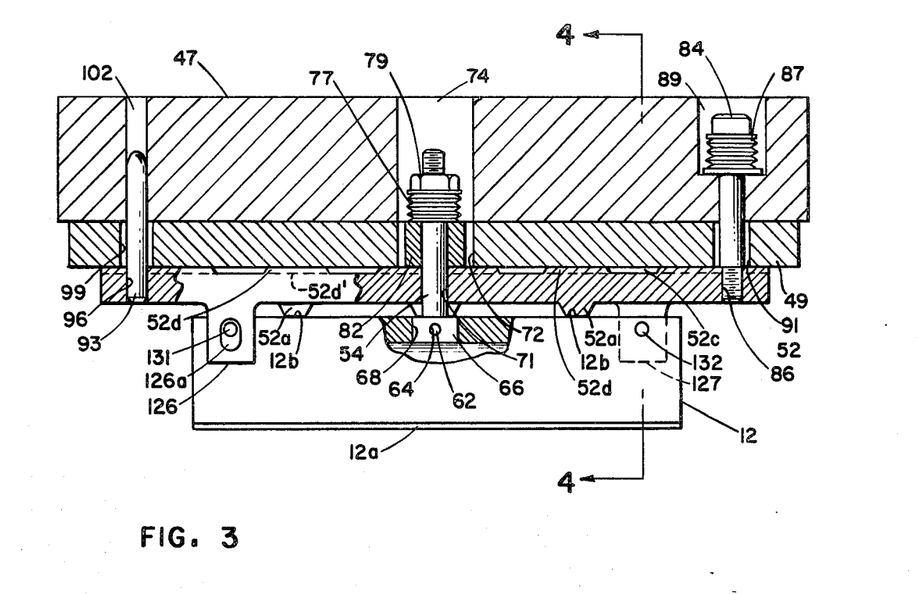
FIG. 3 is an enlarged front elevational view, partially in section, taken along the line 3—3 of FIG. 2, of the thermode and support assembly of FIG. 1, and illustrates in greater detail the manner in which the thermode is secured to the support assembly through a resiliently mounted and centrally located support rod.

As for minimizing thermode heat loss, this is accomplished as a result of the three plate-die set construction of the thermode support assembly 14, best seen in FIGS. 2 and 3. More specifically, that assembly is comprised of an upper internally cooled metal plate 47, an intermediate insulative member or plate 49, and a lower metal plate 52, against which the thermode 12 is continuously resiliently biased by means of a uniquely positioned and mounted support rod 54. With the thermode support assembly thus constructed, it is seen that the intermediate insulative plate 49 effectively shields the heat of the thermode from the upper plate 47, and with the latter being internally cooled, heat loss to the connecting arm or piston 56 (seen only in FIG. 1) of a reciprocal drive source (not shown) is greatly minimized.

This not only advantageously contributes to a more uniform temperature gradient along the length dimension of the thermode 12, but even more significantly, as previously noted, allows the heater cartridge 39 to operate at a lower temperature "set point" in order to attain a given bonding rail operating temperature. As a result, not only is power conserved, and the life of the heater cartridge significantly extended, but thermode dimensional stability or uniformity is also enhanced.

It is appreciated, of course, that in certain applications, it may be desirable, or necessary, to employ two or more longitudinally disposed heater cartridges within a given thermode. In that case, the cartridges would preferably be positioned so as to be at least approximately equally spaced from both each other, and from the outer walls of the thermode.

With respect to supporting the thermode 12 in a manner that does not adversely impede the thermal expansion or contraction thereof, this is accomplished in accordance with an aspect of the present invention by coupling the thermode, at its midpoint, to the support assembly 14 through the aforementioned resiliently mounted support rod 54. More specifically, the lower end of the support rod is connected to the thermode 12 by means of a laterally disposed pin 62 (seen only in FIG. 3) that extends through a bore 64 of an insert 66 which, in turn, is suitably secured within a central recess 68 formed in the upper surface of the thermode. The use of a loose pin coupling rather than a threaded connection between the lower end of the support rod and the insert has been found to greatly facilitate the removal of the thermode, if required, for subsequent repair or replacement.

Figure 5:
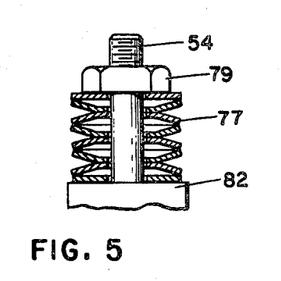
FIG. 5 is an enlarged, fragmentary detail sectional view of the upper end of the thermode support rod, with a stack of compressively biased Belleville-type washers being coaxially mounted thereon, in accordance with the principles of the present invention.

The upper end of the support rod 54 is threaded, and extends through aligned oversized bores 71 and 72 formed in the lower plate 52 and in the intermediate plate 49, respectively, and terminates in a substantially oversized bore 74 formed in the upper internally cooled plate 47 of the composite thermode support assembly 14. Upward spring-biased force is exerted on the support rod 54 and, hence, on the thermode 12, by means of a stack of Belleville-type washers 77 which are coaxially mounted on the upper end portion of the support rod. The Belleville washers are maintained under continuous predetermined compressive force as a result of being confined between a readily adjustable threaded nut 79, which engages mating threads formed on the upper end of the support rod, and a stationary spacer block 82. The latter is confined within the oversized bore 72 formed in the intermediate insulative plate 49, with the lower surface thereof resting on the upper surface of the lower support plate 52.

As a result of the Belleville washers 77 being permanently biased in a compressive state, a plurality of laterally spaced top wall surface areas 12b of the thermode are continuously maintained in abutting relationship with a corresponding number (three being shown) of downwardly protruding ribs or pedestals 52a, preferably formed as an integral part of the lower support plate 52a.

With the thermode thus supported, it is advantageously free to expand and contract in any direction. Equally important, continuous parallelism is assured between not only the thermode 12 and its associated composite support assembly 14, but between the thermode and the underlying articles, of whatever type, to be thermocompression bonded together. Such parallelism is assured regardless whether the thermode is in a heated or unheated state.

It is also significant to note that with the Belleville washers 77 being confined within the oversized bore 74 of the upper internally cooled support plate 47, and with the washers further being effectively isolated from the thermode by the intermediate insulative plate 49, the resilient life of the washers is greatly extended. In this regard, it should further be appreciated that a coil spring, for example, could be employed in place of the Belleville washers. The latter, however, normally inherently establish a wider range of resilient forces for a given range of displacement, and for a given volume of required space. Belleville washers have also been found to establish a resilient force that is more compatible with the very small thermal expansion and contraction dimensional variations exhibited by the thermode. In the present application, such washers are preferably made out of a material such as stainless steel.

Considering the construction and assembly of the three plate die set of the support assembly 14 now in greater detail, the plates 47, 49 and 52 are secured together by a pair of diagonally disposed fastening members 84, best seen in FIGS. 3 and 3. The lower end of each of these members is threaded into respectively aligned tapped holes 86 formed in the lower plate 52, and are preferably spring-biased, such as by means of a plurality of Belleville washers 87. The latter are coaxially mounted on the upper head-defined end portion of each fastener 84, and are confined within, and rest on an annular shoulder of, an associated oversized bore 89 formed in the upper plate 49. As best seen in FIG. 3, the shank portion of each fastening member 84 passes through an oversized bore 91 formed in the intermediate insulating plate 49 so as to allow the upper and lower metal plates 47 and 52, respectively, to thermally expand and contract independently of the intermediate plate.

As also seen selectively in FIGS. 2 and 3, the lower end of each of two diagonally disposed alignment pins 93 (only one seen in FIG. 3) is force-fit inserted within an associated bore 96 formed in the lower plate 52. An intermediate portion of each pin passes through an aligned, but oversized bore 99 formed in the intermediate plate 42, with the upper end portion of each pin terminating within an aligned loose fitting bore 102 formed in the upper plate 47. As thus assembled, the alignment pins 93 likewise allow the upper and lower plates 47 and 52 to thermally expand and contract independently of the intermediate plate. In addition, with the pins not being force-fit within the associated bores in the upper plate 47, the intermediate and lower plates may be easily removed from the upper plate during any possible subsequent disassembly of the apparatus for repairs, for example.

With the intermediate insulative plate 49 being deliberately formed with oversized bores to accommodate the support rod 54, fastening member 84 and alignment pins 93, a need arose for a reliable way to initially accurately position the intermediate plate during the assembly of the composite three plate-die set. This alignment problem is resolved in the present illustrative embodiment through the use of two mutually disposed keyway-guided stop members 106, selectively seen only in FIGS. 2 and 6.

Figure 6:
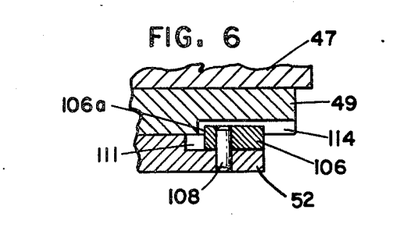
FIG. 6 is a fragmentary detail view, taken along the line 6—6 of FIG. 2, illustrating the manner in which a nesting stop is positioned and secured within the composite support assembly.

Considered more specifically, each of the stop members 106 is secured by a pin 108 within an associated one of two elongated slots 111 formed in different end regions, and communicating with the inner surface, of the lower support plate 52. Each member is dimensioned so as to also be partially received within an associated and aligned one of two keyways 114 formed in opposite end regions, and communicating with the lower surface, of the intermediate plate 49. With the stop members 106 thus mounted, the forward face portions 106a thereof are adapted to function as stops which facilitate the accurate positioning (nesting) of the intermediate plate 49 relative to the upper and lower plates 47 and 52, prior to all three plates being resiliently clamped together during final assembly by means of the fastening members 84.

With specific reference again to the upper plate 47 of the composite support assembly 14, it may be made out of regular steel, but stainless steel is preferable, and is formed with a plurality of internal channels 116, shown only in phantom line form in FIG. 1, so as to be cooled by chilled water (or any other suitable liquid) supplied from a source (not shown) through inlet and outlet tubes 118 and 119, respectively. In this connection, the support bed 21 may also be constructed to be internally cooled, if desired, with only inlet and outlet tubes 121 and 122 being shown in FIG. 1.

A ball joint mounting assembly 124 is shown secured to the top side of the upper support plate 47, with the aforementioned drive rod or piston 56, such as of a pneumatic cylinder (not shown) being suitably secured to the ball thereof. Such a freely pivotal drive source connection compensates for any slight misalignment of the drive source with the support assembly 14 and, thus, ensures that very reliable, low friction reciprocal displacement will be imparted to the thermode. As previously noted, the heat from the thermode is also advantageously effectively isolated from the drive source as a result of both the interposed internally cooled upper support plate 47 and the heat-shielding insulative plate 49.

Considering the lower support plate 52 again in greater detail, it is preferably made out of stainless steel and, as previously noted, is formed with a plurality of downwardly projecting, reference-aligning ribs 52a. The spaces 52b between the ribs define air channels that facilitate the isolation of the heat generated by the thermode from the upper plate 47 and drive source (not shown) coupled thereto. The upper surface of the plate 52 is also formed with a plurality of air channels 52c, with the pedestal areas 52d defined therebetween being shown with horizontal dash lines 52d', seen only in FIG. 3, that further represent the optional formation of a plurality of smaller air channels that may be formed into a grid or lattice type configuration, with such smaller channels communicating with the larger air channels 52d and/or the outer wall areas of the lower plate 52.

The plate 52, as illustrated, also has two longitudinally disposed pairs of brackets 126 and 127 that extend downwardly therefrom. The brackets preferably comprise an integral part of the plate 52, but they may also be secured thereto in any suitable manner. In a typical application, the brackets of each pair are spaced apart so as to define a space therebetween that is slightly oversized relative to the width dimension of the thermode 12 when it is cold. Concomitantly, such spacing is also preferably chosen so that the brackets of each pair provide a slight interference fit for the interposed thermode when the latter is heated to the requisite temperature. Such frictional engagement of the brackets with the thermode, utilizing biasing forces that in no way endanger the elastic limits of the brackets, insures that the heated thermode will always be precisely angularly aligned, in the horizontal plane, relative to the bond sites on two underlying articles to be thermocompression bonded together.

Each bracket, as shown, is also formed with a keyway 126a or 127a formed along a lower end region thereof. In the one illustrative embodiment, for reasons described hereinbelow, only two diagonally disposed ones of the keyways are actually employed to freely receive an aligned one of two pins 131, 132, which extend outwardly from opposite sidewalls of the thermode 12 (pin 131 seen only in FIG. 3 and pin 132 seen only in FIG. 4). Each of these pins is preferably nested within an associated close fitting bore 134 located adjacent the upper sidewall of the thermode 12. As illustrated in FIG. 4, the outwardly projecting portion of each pin 131 or 132 extends only partially into the aligned bore 134. With these pins thus mounted, they may be easily driven out of their respective nesting bores 134 without having a tendency for the ends to flare out during their removal.

It should be appreciated that the pins 131, 132, as received in oversized keyways, in no way restrict the thermal expansion and contraction of the thermode, nor are such pins relied upon to normally support or guide the thermode during a bonding operation. Rather, the pins and associated bracket-formed keyways are only employed to provide a temporary means of supporting the thermode should the coupling pin 62 for the support rod 54 ever break, or should the Belleville washers 77 mounted thereon collapse, after a period of long use due to metal fatigue, for example. The possibility of either of these situations happening, however, is very remote in practice.

In a typical bonding operation, it may often be advantageous to cover the underside exposed surface border areas of the platen 16, the four posts 18, bushings 19 and the upper side border surface areas of the support bed 21 with suitable heat-shielding material (not shown). The shield material may comprise, for example, commercially available ceramic paper which has been found to significantly reduce the very intense radiant heat, from a red-hot thermode 12, that would be directed against the various selected parts of the composite apparatus 10 if not shielded. The need for such precautionary measures, of course, will depend on a number of selective factors in any given bonding application, such factors including the temperature of the thermode, the spacing thereof from associated parts of the composite support structure, and the materials out of which the various parts of the support structure are made.

While a preferred thermocompression bonding apparatus has been described herein that minimizes, if not eliminates, the prior troublesome tendency of the bonding thermode thereof to acquire a bowed profile, particularly along the bonding rail thereof when heated to the requisite bonding temperature, it is obvious that various modifications may be made to the present illustrative embodiment of the invention, and that a number of alternative related embodiments could be devised by one skilled in the art without departing from the spirit and scope of the invention.

What is claimed is:

1. A thermocompression bonding apparatus, which comprises:

a thermode having a main body portion with a longitudinal length greater than the width thereof, and formed with at least one centrally located, and longitudinally extending bore for mounting an elongated heating element therewithin, said thermode further including a portion along the central region of the upper surface thereof adapted to be pin-coupled to the lower end of a support rod, and said thermode additionally having a lower face portion formed with at least one longitudinally disposed bonding rail;

a composite thermode support assembly, including a multi-plate die set, with at least two of said plates providing different types of heat shielding from the radiant heat generated by said thermode, wherein said die set of said thermode support assembly includes an upper metal plate adapted for internal cooling, an intermediate insulative heat-shielding plate and a lower metal plate, with all of said plates being resiliently secured together by a plurality of fastening and alignment means in a manner that allows the upper and lower plates to expand and contract independently of the intermediate plate, and a resiliently mounted, and downwardly extending support rod, the lower end of the latter being pin-coupled to said upper, central portion of said thermode, with an upper end portion of said support rod extending into a central, oversized bore of said multi-plate die set, with the latter further including biasing means coaxially mounted on the upper end portion of said support rod, and maintained under a predetermined amount of compressive force between an adjustable upper stop member, mounted on said support rod, and a portion of said die set so as to continuously urge upper surface areas of said support rod-coupled thermode against lower protruding reference alignment areas of said die set, said thermode thus being allowed to thermally expand in all directions while being heated and, thereby, minimize any tendency of the thermode bonding rail, in particular, to acquire a detrimental non-linear profile along the length dimension thereof, and means for supporting and reciprocally displacing said support assembly, together with said thermode, such that the bonding rail of the latter may be brought into bonding engagement with two articles to be joined together when supported and aligned therebeneath.

2. A thermocompression bonding apparatus in accordance with claim 1 wherein said lower plate of said die set includes at least two spaced pairs of brackets that extend downwardly from the underside thereof, said brackets being dimensioned to closely straddle the thermode along opposite sidewall regions thereof so as to accurately maintain said thermode in the desired horizontal angular orientation relative to said die set.

3. A thermocompression bonding apparatus in accordance with claim 2 wherein said biasing means coaxially mounted on the upper end portion of said support rod comprises a plurality of Belleville washers, with the latter being confined within the oversized central bore of said upper plate of said die set, and wherein said portion of said die set against which the lowermost washer is biased comprises an annular spacer block through which said support rod passes, and which block rests on the upper surface of said lower plate of said die set, and wherein at least two diagonally disposed ones of said two pairs of support assembly lower plate brackets are formed with oversized keyways, with said thermode further including at least two opposite sidewall-secured pins that extend outwardly a short distance into the respectively associated ones of said keyways without in any way normally restricting the thermal expansion and contraction of said thermode.

4. A thermocompression bonding apparatus in accordance with claim 1 wherein said means for supporting and reciprocally displacing said support assembly comprises an upper platen, reciprocally mounted through bushings on a plurality of vertically oriented and spaced posts, with the lower ends of the posts being secured within respective bores of a support bed forming part of said supporting means, said last mentioned means further including an article-supporting bonding platform retractably mounted on said support bed.

5. A thermocompression bonding apparatus in accordance with claim 4 wherein said lower plate of said die set includes at least two spaced pairs of brackets that extend downwardly from the underside thereof, said brackets being dimensioned to closely straddle the thermode along opposite sidewall regions thereof so as to accurately maintain said thermode in the desired horizontal angular orientation relative to said die set.

6. A thermocompression bonding apparatus in accordance with claim 1 wherein the upper and lower surfaces of said die set lower plate are configured to define a plurality of air channels at the interfaces established with the underside of said intermediate insulative plate and the upper surface of said thermode, respectively.

7. A thermocompression bonding apparatus in accordance with claim 1 wherein said pin-coupled portion along the upper central region of said thermode comprises an insert secured within a recessed slot formed in the upper surface, and extending across the width dimension, of said thermode, said insert having a second bore oriented perpendicular to, and extending through, the first bore for receiving said thermode-support rod coupling pin.

8. A thermocompression bonding apparatus in accordance with claim 7 wherein the upper and lower surfaces of said die set lower plate are configured to define a plurality of air channels at the interfaces established with the underside of said intermediate insulative plate and the upper surface of said thermode, respectively.

9. A thermocompression bonding apparatus in accordance with claim 8 wherein said means for supporting and reciprocally displacing said support assembly comprises an upper platen, reciprocally mounted through bushings on a plurality of vertically oriented and spaced posts, with the lower ends of the posts being secured within respective bores of a support bed forming part of said supporting means, said last mentioned means further including an article-supporting bonding platform retractably mounted on said support bed.

10. A thermocompression bonding apparatus in accordance with claim 4 wherein said pin-coupled portion along the upper central region of said thermode comprises an insert secured within a recessed slot formed in the upper surface, and extending across the width dimension, of said thermode, said insert extending across the width dimension of said thermode, and having a first vertically oriented and centrally located bore for receiving the lower end of said support rod, and having a second bore oriented perpendicular to, and extending through, the first bore for receiving said thermode-support rod coupling pin.

11. A thermocompression bonding assembly particularly adapted for use in simultaneously effecting a plurality of reliable bonds between two articles having overlying/underlying arrays of bonding sites, said bonding assembly comprising:

a thermode having a main body portion with a longitudinal length greater than the width thereof, and formed with at least one centrally located, and longitudinally extending bore for mounting an elongated heating element therewithin, said thermode further including a portion along the central region of the upper surface thereof adapted to be pin-coupled to the lower end of a support rod, and said thermode additionally having a lower face portion formed with at least one longitudinally disposed bounding rail, and a composite thermode support asembly adapted for securement assembly including a multi-plate die set, with at least two of said plates providing different types of heat shielding from the radiant heat generated by said thermode, wherein said die set of said thermode support assembly includes an upper metal plate adapted for internal cooling, an intermediate insulative heat-shielding plate and a lower metal plate, with all of said plates being resiliently secured together by a plurality of fastening and alignment means in a manner that allows the upper and lower plates to expand and contract independently of the intermediate plate, and a resiliently mounted, and downwardly extending support rod, the lower end of the latter being pin-coupled to said upper, central portion of said thermode, with an upper end portion of said support rod extending into a central, oversized bore of said multi-plate die set, with the latter further including biasing means coaxially mounted on the upper end portion of said support rod, and maintained under a predetermined amount of compressive force between an adjustable upper stop member, mounted on said support rod, and a portion of said die set so as to continuously urge upper surface areas of said support rod-coupled thermode against lower protruding reference alignment areas of said die set, said thermode thus being allowed to thermally expand in all directions while being heated and, thereby, minimize any tendency of the thermode bonding rail, in particular to acquire a detrimental non-linear profile along the length dimension thereof.

12. A thermocompression bonding assembly in accordance with claim 11 wherein said lower plate of said die set includes at least two spaced pairs of brackets that extend downwardly from the underside thereof, said brackets being dimensioned to closely straddle the thermode along opposite sidewall regions thereof so as to accurately maintain said thermode in the desired horizontal angular orientation relative to said die set.

13. A thermocompression bonding assembly in accordance with claim 12 wherein said biasing means coaxially mounted on the upper end portion of said support rod comprises a plurality of Belleville washers, with the latter being confined within the oversized central bore of said upper plate of said die set, and wherein said portion of said die set against which the lowermost washer is biased comprises an annular spacer block through which said support rod passes, and which block rests on the upper surface of said lower plate of said die set, and wherein at least two diagonally disposed ones of said two pairs of support assembly lower plate brackets are formed with oversized keyways, with said thermode further including at least two opposite sidewall-secured pins that extend outwardly a short distance into the respectively associated ones of said keyways without in any way normally restricting the thermal expansion and contraction of said thermode.

14. A thermocompression bonding assembly in accordance with claim 11 wherein the upper and lower surfaces of said die set lower plate are configured to define a plurality of air channels at the interface established with the underside of said intermediate insulative plate and the upper surface of said thermode, respectively.

15. A thermocompression bonding assembly in accordance with claim 11 wherein said pin-coupled portion along the upper central region of said thermode comprises an insert secured within a recessed slot formed in the upper surface, and extending across the width dimension, of said thermode, said insert extending along the width dimension of said thermode, and having a first vertically oriented and centrally located bore for receiving the lower end of said support rod, and having a second bore oriented perpendicular to, and extending through, the first bore for receiving said thermode-support rod coupling pin.

16. A thermocompression bonding assembly in accordance with claim 15 wherein said die set of said thermode support assembly includes an upper metal plate adapted for internal cooling, an intermediate insulative heat-shielding plate and a lower metal plate, with all of said plates being resiliently secured together by a plurality of fastening and alignment means in a manner that allows the upper and lower plates to expand and contract independently of the intermediate plate.

17. A thermocompression bonding assembly in accordance with claim 16 wherein the upper and lower surfaces of said die set lower plate are configured to define a plurality of air channels at the interfaces established with the underside of said intermediate insulative plate and the upper surface of said thermode, respectively.

18. A thermocompression bonding assembly in accordance with claim 17 wherein said biasing means coaxially mounted on the upper end portion of said support rod comprises a plurality of Belleville washers, with the latter being confined within the oversized central bore of said upper plate of said die set.

* * * * *